(12) United States Patent
Daoud

(10) Patent No.: US 6,249,636 B1
(45) Date of Patent: Jun. 19, 2001

(54) HIGH DENSITY FUSION SPLICE HOLDER

(75) Inventor: Bassel Hage Daoud, Parsippany, NJ (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/391,017

(22) Filed: Sep. 7, 1999

(51) Int. Cl.⁷ ...................................................... G02B 6/00
(52) U.S. Cl. .......................... 385/137; 385/135; 385/136; 439/540.1
(58) Field of Search ..................................... 385/114, 135, 385/136, 137, 147, 134; 439/540.1, 629

(56) References Cited

U.S. PATENT DOCUMENTS

| | | | | |
|---|---|---|---|---|
| 5,530,786 | * | 6/1996 | Radliff | 385/137 |
| 5,566,268 | * | 10/1996 | Radliff et al. | 385/137 |
| 5,566,269 | * | 10/1996 | Eberle, Jr. et al. | 385/137 |
| 5,590,234 | * | 12/1996 | Pulido | 385/135 |
| 5,862,291 | * | 1/1999 | Stockman et al. | 385/136 |
| 5,980,312 | * | 11/1999 | Chapman et al. | 439/540.1 |

* cited by examiner

Primary Examiner—Loha Ben
(74) Attorney, Agent, or Firm—Stroock & Stroock & Lavan LLP

(57) ABSTRACT

A splice holder is provided for accommodating a plurality of splices of different sizes. The holder is formed with a base from which extend a plurality of splice holder elements, and a plurality of deflectable arms. The splice holder elements are each formed with a primary channel sized to receive and hold a fusion splice. Additionally, a secondary channel is defined between each pair of adjacent splice holder elements that is also sized to receive and hold a fusion splice. The primary and secondary channels are staggered to increase the number of splices the holder can accommodate without increasing the size thereof. Further, the arms are shaped to engage and latch onto array ribbon splices. With the combination of the splice holder elements and the arms, the splice holder can accommodate both fusion splices and array ribbon splices.

22 Claims, 4 Drawing Sheets

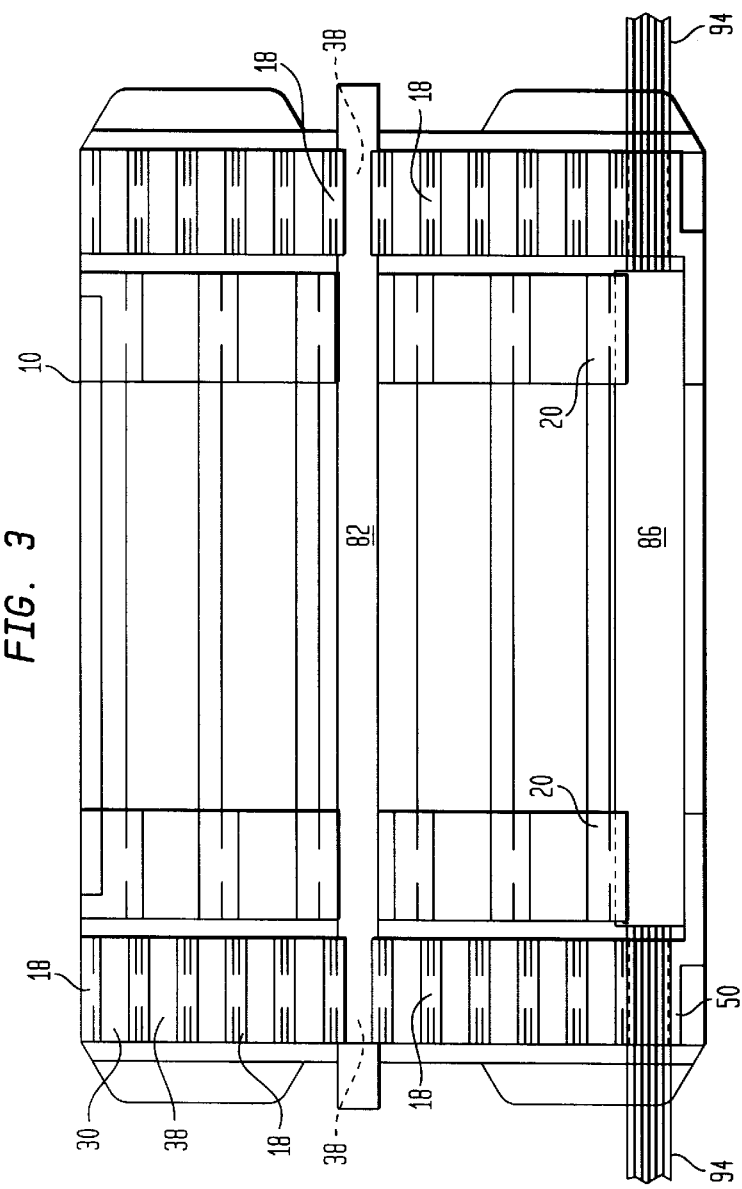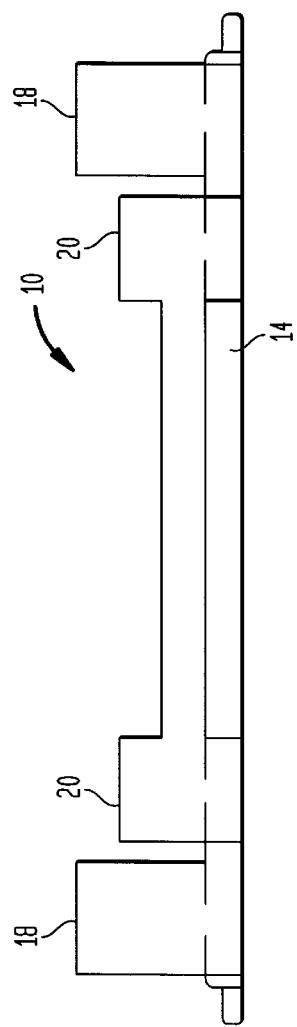

HIGH DENSITY FUSION SPLICE HOLDER

FIELD OF THE INVENTION

This invention relates to the field of fiber optic cable management and, more particularly, to fiber optic cable splice holders.

BACKGROUND OF INVENTION

It is envisioned that one day, all telephone wires will be replaced by fiber optic cables. To be able to properly identify a particular fiber optic cable in a central office, or other station where there may be hundreds to thousands of such cables, fiber optic cable management is necessary, wherein bundles of cables/single cables are passed through holders, guides, etc., to and from terminal points. In this manner, a technician may readily identify a particular cable needing servicing or replacement by its path.

In the prior art, various devices and techniques have been developed to manage standard copper telephone wiring. However, fiber optic cables are physically much weaker and more brittle than copper wiring, and prior art copper wiring management devices and techniques are not entirely transferable to fiber optic cable management. Additionally, splices of fiber optic cables are particularly susceptible to failure and require special consideration.

There are basically two types of fiber optic cable splices: fusion splices and array ribbon splices. A fusion splice is used to join one fiber optic cable to another, wherein the two cables are fused together. An array ribbon is a flat ribbon formed by a plurality of joined fiber optic cables (sheaths disposed about the cables are joined, not the cables themselves). In an array ribbon splice, two array ribbons are mass fused with cables of both ribbons being individually joined. To prevent damage to, and possible failure of, the fused joint, a reinforcing bar is typically provided. Additionally, the reinforcing bar and the fused joint are invaginated within a protective sheath.

As can be readily appreciated, fiber optic cable systems require great numbers of splices. To facilitate management and organization of the cables within such systems, holders have been used in the prior art to hold the splices. (As used herein, the term "splice" refers to the assembly of a fused joint of fiber optic cables, and, generally, although not necessarily, a reinforcing bar and a protective sheath.) With space (in enclosures and other volumes) being at a premium, it is continuously desirable to reduce the size of a splice holder, yet increase the number of splices that it can accommodate. In other words, it is desirable to increase the density of the splice holder—i.e., obtain a higher ratio of the number of splices accommodated by a splice holder relative to the unit area of the splice holder.

Additionally, when assembled, the diameter of a fusion splice is smaller in size than the diameter of an array ribbon splice. (As used herein, the "diameter" of a fusion splice refers to the width of the splice extending between diametrically opposed points on the splice engaged by the holder. Splices generally are circular in cross-section, but may be formed with other cross-sectional shapes including other elliptical shapes, polygonal shapes and irregular shapes.) Consequently, a splice holder designed to hold fusion splices will not accommodate array ribbon splices, and vice versa.

SUMMARY OF THE INVENTION

To overcome shortcomings in the prior art, the present invention comprises a splice holder formed with a plurality of splice holder elements and a plurality of deflectable arms extending from a base of the holder. The holder elements are preferably arranged longitudinally in pairs, with two of the arms between each pair of elements. Each pair of elements and each pair of arms is respectively arranged to engage a single splice. Additionally, each arm is matched with a splice engaging surface, which cooperates with the associated arm to engage and hold a splice.

To maximize the density of splices the holder can achieve, each of the splice holder elements is formed with a primary channel for receiving and holding a splice, preferably a fusion splice, with the center of the splice being at a first distance from the base of the holder. Secondary channels are defined between the splice holder elements for receiving and holding splices at a second distance from the base which is less than the first distance. The location and arrangement of the primary and secondary channels result in a staggered arrangement of engaged splices. As compared to an arrangement where splices are held side-by-side in a single plane, the staggered (higher and lower) arrangement provided by the subject invention allows for a greater number of splices to be accommodated on the splice holder, and, thus a higher density.

The splice holder elements are generally H-shaped, each being formed with a pair of upstanding legs and a bridge extending therebetween. Upper portions of the legs and the bridge of a splice holder element combine to at least partially define the primary channel of the respective element. Additionally, indentations are formed in lower portions of the legs. The indentations of adjacent splice holder elements at least partially define a secondary channel therebetween.

The arms are disposed between the splice holder elements, with preferably two of the arms being longitudinally aligned so as to engage and latch onto a single splice. The arms are formed to accommodate an array ribbon splice, which cross-sectionally is larger than a fusion splice. It should be noted that splices are generally circular in cross-sectional shape, but can be formed with other shapes. To enable the splice holder of the subject invention to accommodate both fusion splices and array ribbon splices, the arms are longitudinally aligned with the splice holder elements such that a splice engaged by an arm or arms will be axially aligned with a secondary channel. The secondary channels are preferably formed to receive fusion splices and are, therefore, too small in diameter to allow the passage therethrough of an array ribbon splice. As is readily appreciated, the array ribbon splice must be sufficiently shortened to fit between the splice holder elements. The portions of the splice holder elements surrounding the secondary channels act as a stop against axial movement of an engaged array ribbon splice. Also, array ribbons extending from an array ribbon splice are caused to be passed through the secondary channels, wherein the secondary channels restrict movement of the array ribbons to limit damage thereto.

The arms are resilient and formed to be deflectable. Each of the arms is formed with an upstanding stem and a latch portion extending transversely therefrom. The stem and latch portion are sized and configured to latch onto and engage an array ribbon splice. Additionally, the stems each define a splice engaging surface on a rear portion thereof, which is opposite from the latch portion. The splice engaging surface of an arm cooperates with the stem and the latch portion of a second arm to engage and hold an array ribbon splice therebetween.

As stated above, the arms are formed to engage and latch onto array ribbon splices, whereas, the primary and secondary channels are preferably formed to receive fusion splices. Accordingly, the required spacing between the stem of one arm and the splice engaging surface of an adjacent arm is greater than the diameter of the primary channel or the diameter of the secondary channel.

Other objects and features of the present invention will become apparent from the following detailed description, considered in conjunction with the accompanying drawing figures. It is to be understood, however, that the drawings, which are not to scale, are designed solely for the purpose of illustration and not as a definition of the limits of the invention, for which reference should be made to the appended claims.

BRIEF DESCRIPTION OF THE DRAWINGS

In the drawing figures, which are not to scale, and which are merely illustrative, and wherein like reference numerals depict like elements throughout the several views:

FIG. 3 is a top plan view of the splice holder of the subject invention with an array ribbon splice being engaged thereby;

FIG. 4 is a side elevational view of the splice holder of the subject invention;

DETAILED DESCRIPTION OF THE PREFERRED EMBODIMENTS

Figure 1:
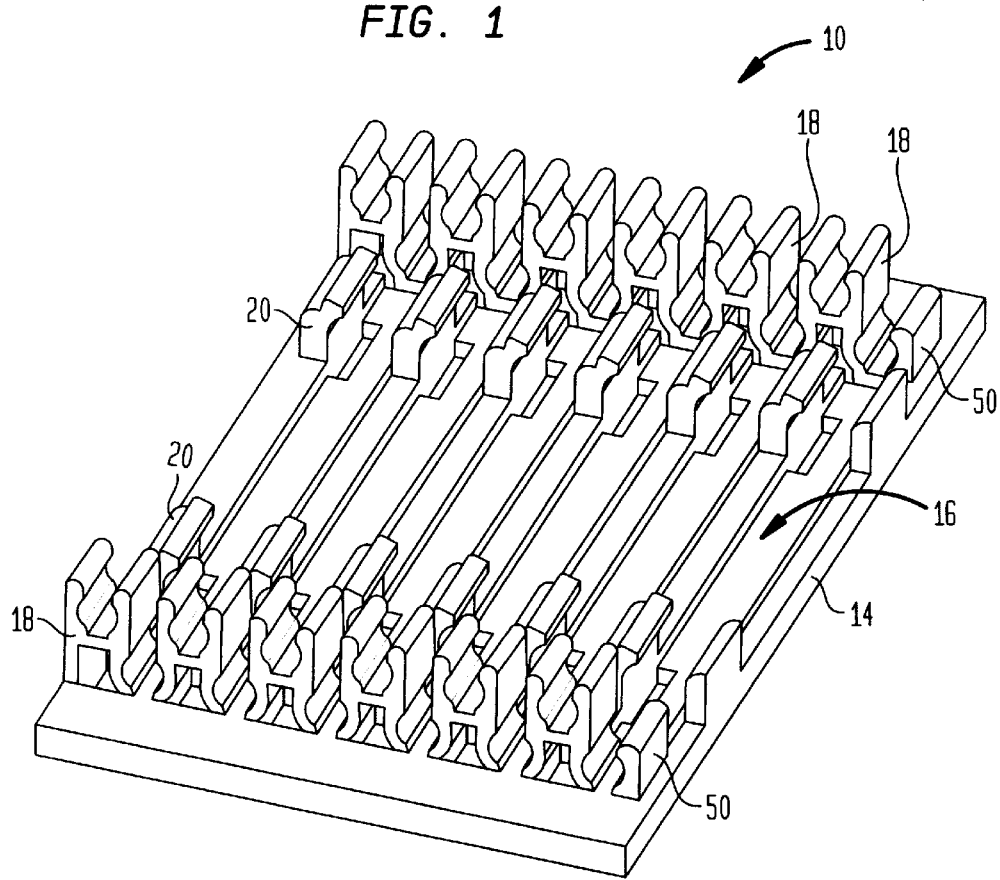
FIG. 1 is a perspective view of the splice holder of the subject invention.

Referring to FIG. 1, a splice holder 10 is shown having a base 14 with an upper surface 16 that extends biaxially in two coordinate directions, both longitudinally and transversely. A plurality of generally H-shaped splice holder elements 18 and a plurality of arms 20 extend upwardly from the upper surface 16.

Figure 2:
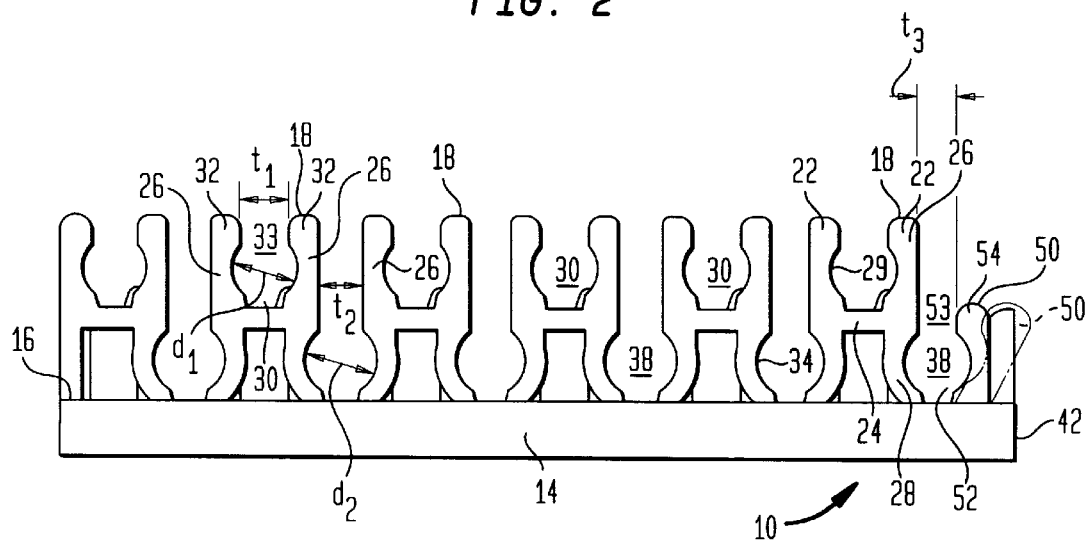
FIG. 2 is an end elevational view of the splice holder of the subject invention.

As shown in FIG. 2, each of the splice holder elements 18 is formed with two upstanding legs 22 and a bridge 24 extending therebetween. The bridge 24 divides the legs 22 into upper leg portions 26 and lower leg portions 28. The upper leg portions 26 and the bridge 24 define a primary channel 30. Preferably, circular indentations 29 are formed in the upper leg portions 26 to give the primary channel 30 a circular shape with a diameter $d_1$. The upper leg portions 26 also have enlarged end portions 32 that extend inwardly to define a throat 33 to the primary channel 30. The throat 33 defines a throat width $t_1$, which is formed to be less than the diameter $d_1$.

The legs 22 are resilient, with the upper leg portions 26 being deflectable. In a natural state, the splice holder elements appear as shown in FIG. 2. Referring to FIG. 2B, a splice 82 is placed into the channel 30 by forcibly inserting the splice 82 between the upper leg portions 26 to cause outward deflection thereof and expansion of the throat 33. The splice 82 passes through the throat 33 and nests within the primary channel 30.

Referring to FIG. 2, adjacent splice holder elements 18 are transversely spaced apart to define a distance $t_2$ between the legs 22 of the elements. Indentations 34 extend into the lower leg portions 28 to define secondary channels 38 having a diameter $d_2$. The distance $t_2$ is less than the diameter $d_2$. As is readily apparent, where the primary channels 30 and the secondary channels 38 are intended to accommodate the same size splice, preferably fusion splices, the diameter $d_1$ is equal to the diameter $d_2$.

Figure 2A:
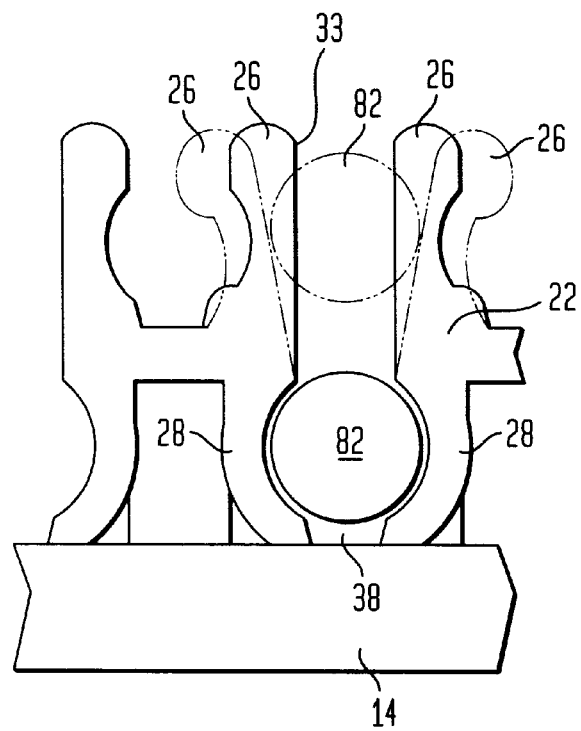
FIG. 2A is an enlarged view of a splice holder element showing deflection of the element's legs about the secondary channel.
Figure 2B:
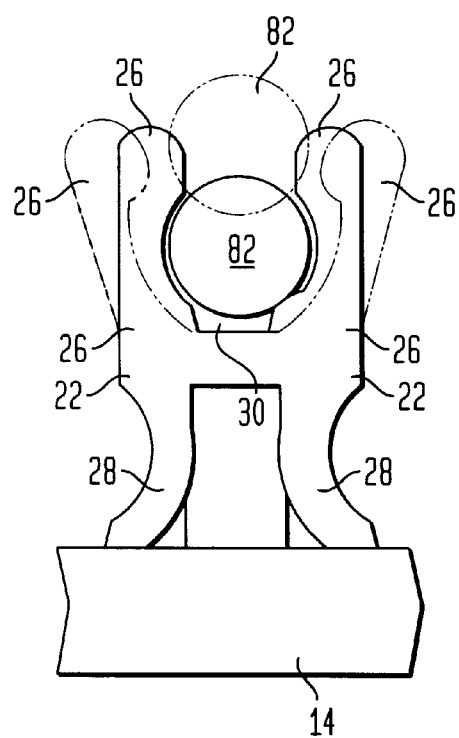
FIG. 2B is an enlarged view of a splice holder element showing deflection of the element's legs about the primary channel.

As shown in FIG. 2A, the splice 82 can be nested in one of the secondary channels 38 by forcibly inserting it between two of the splice holder elements 18 causing the upper leg portions 26 thereof to deflect outwardly and expand throat width $t_2$ with the splice 82 passing therethrough. As is readily appreciated, the insertion of the splice 82 into one of the primary channels 30 requires outward deflection opposite to that of the inward deflection required to insert the splice 82 into one of the secondary channels 38. Accordingly, the secondary channels 38 are to be utilized first to accommodate the splices 82 before the primary channels 30.

In proximity to an edge of the base 14, such as the edge 42, a leg element 50 may be provided where a splice holder element 18 may not fit. The leg element 50 is structured similarly to a lower leg portion 28 to cooperate with the lower leg portion 28 of an adjacent splice holder element 18 to define one of the secondary channels 38 therebetween. The leg element 50 has an indentation 52 formed identically to the indentations 34. Here, however, the leg element 50 has an enlarged portion 54 which defines a throat 53 having a throat width $t_3$. The throat width $t_3$ is less than the diameter $d_2$ of the secondary channels 38. The leg element 50 is resilient and deflectable to allow for the forced insertion of a splice and expansion of the throat width $t_3$.

Referring to FIG. 3, in a preferred embodiment, the splice holder 10 is provided with two arrays of the splice holder elements 18 that are axially spaced apart. Primary channels 30 and secondary channels 38 of the spaced apart holder elements 18 are longitudinally aligned to engage a single splice. For example, as shown in FIG. 3, the fusion splice 82 extends between and is held within the secondary channels 30 of two longitudinally spaced apart splice holder elements 18.

Figure 5:
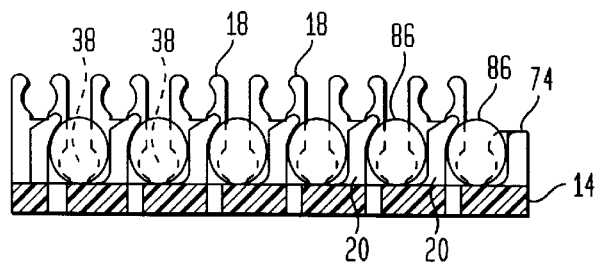
FIG. 5 is a cross-sectional view of the splice holder with a plurality of array ribbon splices being engaged thereby.
Figure 6:
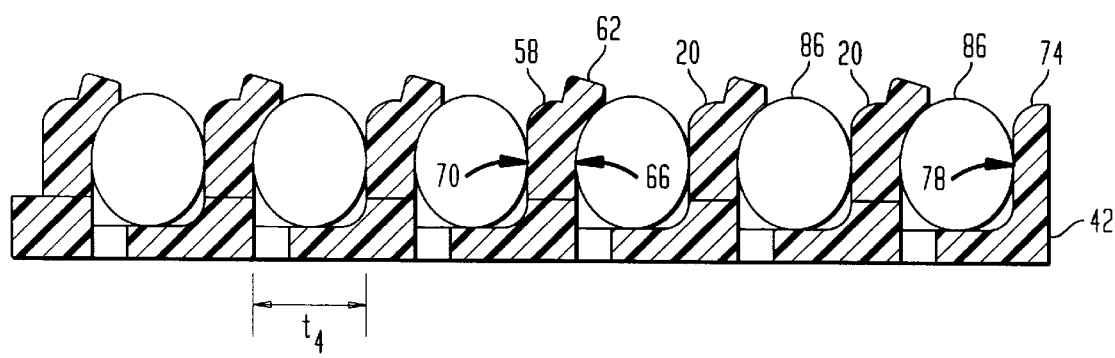
FIG. 6 is an enlarged cross-sectional view of the arms engaging array ribbon splices.

The arms 20 are each formed with a stem 58 and a latch portion 62, as best shown in FIGS. 5 and 6. The arms 20 are also resilient and deflectable to allow for rearward deflection and latching onto splices with the latch portions 20. The stems 58 each have an inner surface 66 and a rear splice engaging surface 70. The arms 20 are arranged so that a spacing $t_4$ is defined between the inner surface 66 and the rear splice engaging surface 70 of adjacent arms 20. As shown in FIGS. 5 and 6, adjacent arms 20 cooperate to receive and hold array ribbon splices 86. Specifically, the inner surface 66 of the stem 58 presses against the engaged splice 86 which is clamped between the respective arm 20 and the splice engaging surface 70 of the adjacent arm 20.

In proximity to the edge 42 of the base 14, an upstanding abutment wall 74 is provided having an inwardly facing splice engaging surface 78. The abutment wall 74 is used where a splice receiving surface is required, but a full arm 20 does not fit within the bounds of the base 14.

The arms 20 are located intermediate the splice holder elements 18, as shown in FIG. 3. The array ribbon splice 86 defines a larger diameter than the fusion splice 82, and, a larger diameter than the diameter $d_2$ of the secondary channels 38. In the preferred embodiment, where the primary channels 30 and the secondary channels 38 are sized to accommodate fusion splices 82, the spacing $t_4$ is greater than the diameters $d_1$ and $d_2$. When engaged by the arms 20, the array ribbon splices 86 are axially aligned with the secondary channels. Due to the difference in diameter between the array ribbon splices 86 and the secondary channels 38, the array ribbon splices 86 must be sufficiently shortened to fit between the splice holder elements 18. Advantageously, portions of the splice holder elements 18 surrounding the secondary channels 38 act as stops against axial movement of any engaged array ribbon splices 86. Furthermore, array ribbons 94, which extend from the array ribbon splices 86, are caused to pass through the secondary channels 38 which restrict the movement thereof and limit possible damage thereto.

Preferably, the arms 20 are longitudinally aligned in pairs to have two of the arms 20 simultaneously engage a single of the array ribbon splices 86.

Figure 7:
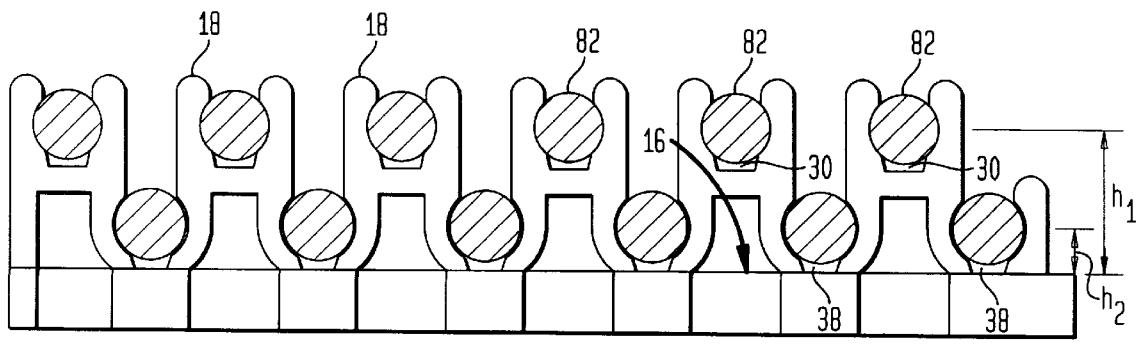
FIG. 7 is an enlarged end elevational view of the splice holder with a plurality of fusion splices being engaged thereby.

With reference to FIG. 7, a plurality of the fusion splices 82 may be engaged and held by the splice holder 10. The locations of the primary and secondary channels provides for a staggered arrangement of the fusion splices 82 with the splices being arranged at two different heights. Specifically, the centers of fusion splices 82 held within the primary channels 30 are maintained at a height $h_1$ which is greater than the height $h_2$ at which the centers of the splices held within the secondary channels 38 is maintained. With this arrangement, the number of fusion splices 82 held by the splice holder 10 is increased without increasing the overall size of the holder. Also, the combination of the splice holder elements 18 and the arms 20 allows for accommodation of both fusion splices and array ribbon splices.

Thus, while there have been shown and described and pointed out fundamental novel features of the invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

What is claimed is:

1. A splice holder for accommodating fiber optic splices, said splice holder comprising:
   a base having an upper surface which biaxially extends both in a longitudinal direction and in a transverse direction;
   a first splice holder element extending upwardly from said upper surface of said base, said first splice holder element defining a primary channel formed to receive and hold a first splice in the longitudinal direction such that the center of the first splice is located at a first distance from said upper surface of said base; and,
   a second splice holder element extending upwardly from said upper surface of said base, said second splice holder element being transversely spaced from said first splice holder element, said first splice holder element and said second splice holder element cooperatively defining a secondary channel therebetween formed to receive and hold a second splice in the longitudinal direction such that the center of the second splice is located at a second distance from said upper surface of said base, said first distance being greater than said second distance.

2. A splice holder as in claim 1 further comprising a third splice holder element extending upwardly from said upper surface of said base, said third splice holder element defining a second primary channel formed to receive and hold the first splice, said third splice holder element being longitudinally aligned with said first splice holder element such that said primary channel and said second primary channel will both engage and hold the first splice.

3. A splice holder as in claim 2 further comprising a first arm extending upwardly from said upper surface of said base, said first arm being located intermediate said first splice holder element and said third splice holder element, said first arm being formed to engage and latch onto a third splice having a cross-sectional diameter larger than a cross-sectional diameter of the first splice.

4. A splice holder as in claim 3 further comprising a second arm extending upwardly from said upper surface of said base, said second arm being transversely spaced from said first arm.

5. A splice holder as in claim 4, wherein said second arm defines a splice engaging surface facing said first arm, said splice engaging surface being spaced a distance from said first arm, wherein said primary channel defines a primary diameter smaller than said distance.

6. A splice holder as in claim 1 further comprising a first arm extending upwardly from said upper surface of said base, said first arm being longitudinally spaced from said first splice holder element, said first arm being formed to engage and latch onto a third splice, the third splice being cross-sectionally formed with a third diameter, said first splice being cross-sectionally formed with a first diameter smaller than the third diameter.

7. A splice holder as in claim 6 further comprising a second arm extending upwardly from said upper surface of said base, said second arm being transversely spaced from said first arm.

8. A splice holder as in claim 7, wherein said second arm defines a splice engaging surface facing said first arm, said splice engaging surface being spaced a distance from said first arm, wherein said primary channel defines a primary diameter smaller than said distance.

9. A splice holder as in claim 1, wherein said primary channel defines a primary diameter, said secondary channel defines a secondary diameter, said primary diameter and said secondary diameter being substantially equal.

10. A splice holder as in claim 1, wherein said first splice holder element is generally H-shaped having two upstanding legs and a bridge extending therebetween, upper portions of said legs and said bridge defining at least part of said primary channel.

11. A splice holder as in claim 10, wherein a lower portion of at least one said leg is indented to define a portion of said secondary channel.

12. A splice holder for accommodating fiber optic splices, said splice holder comprising:
   a base having an upper surface;
   a first splice holder element extending upwardly from said upper surface of said base, said first splice holder element defining a primary channel formed to receive and hold a first splice such that the center of the first splice is located at a first distance from said upper surface of said base;
   a second splice holder element extending upwardly from said upper surface of said base, wherein said first splice holder element and said second splice holder element cooperatively defining a secondary channel therebetween formed to receive and hold a second splice such that the center of the second splice is located at a second distance from said upper surface of said base, said first distance being greater than said second distance; and, a first arm extending upwardly from said upper surface of said base, said first arm being formed to engage and latch onto a third splice having a cross-sectional diameter larger than a cross-sectional diameter of the first splice.

13. A splice holder as in claim 12 further comprising a third splice holder element extending upwardly from said upper surface of said base, said third splice holder element defining a second primary channel formed to receive and hold the first splice, said third splice holder element being longitudinally aligned with said first splice holder element such that said primary channel and said second primary channel will both engage and hold the first splice.

14. A splice holder as in claim 13, wherein said first arm is located intermediate said first splice holder element and said third splice holder element.

15. A splice holder as in claim 14 further comprising a second arm extending upwardly from said upper surface of said base, said second arm being transversely spaced from said first arm.

16. A splice holder as in claim 15, wherein said second arm defines a splice engaging surface facing said first arm, said splice engaging surface being spaced a distance from said first arm, wherein said primary channel defines a primary diameter smaller than said distance.

17. A splice holder as in claim 12, wherein said first arm is longitudinally spaced from said first splice holder element.

18. A splice holder as in claim 17 further comprising a second arm extending upwardly from said upper surface of said base, said second arm being transversely spaced from said first arm.

19. A splice holder as in claim 18, wherein said second arm defines a splice engaging surface facing said first arm, said splice engaging surface being spaced a distance from said first arm, wherein said primary channel defines a primary diameter smaller than said distance.

20. A splice holder as in claim 12, wherein said primary channel defines a primary diameter, said secondary channel defines a secondary diameter, said primary diameter and said secondary diameter being substantially equal.

21. A splice holder as in claim 12, wherein said first splice holder element is generally H-shaped having two upstanding legs and a bridge extending therebetween, upper portions of said legs and said bridge defining at least part of said primary channel.

22. A splice holder as in claim 21, wherein a lower portion of at least one said leg is indented to define a portion of said secondary channel.

* * * * *